United States Patent [19]

Sato

[11] 4,123,118
[45] Oct. 31, 1978

[54] ANTILOCK BRAKE CONTROL SYSTEM FOR A MOTORCYCLE FRONT WHEEL

[75] Inventor: Takefumi Sato, Tenri, Japan

[73] Assignee: Sharp Kabushiki Kaisha, Osaka, Japan

[21] Appl. No.: 756,834

[22] Filed: Jan. 5, 1977

[51] Int. Cl.² .............................................. B60T 8/06
[52] U.S. Cl. ...................................... 303/119; 303/73; 303/105; 303/113
[58] Field of Search ................. 303/68, 72, 73, 76, 303/106, 113, 115, 119, 105, 20, 6 C

[56] References Cited

U.S. PATENT DOCUMENTS

| 3,514,160 | 5/1970 | Lieber | 303/119 |
| 3,637,264 | 1/1972 | Leiber et al. | 303/119 |
| 3,639,009 | 2/1972 | Klein et al. | 303/119 |
| 3,806,207 | 4/1974 | Reinecke et al. | 303/6 C |
| 3,888,550 | 6/1975 | Reinecke et al. | 303/20 |

FOREIGN PATENT DOCUMENTS

| 2,431,218 | 1/1975 | Fed. Rep. of Germany | 303/119 |
| 1,386,713 | 3/1975 | United Kingdom | 303/119 |
| 1,433,658 | 4/1976 | United Kingdom | 303/6 C |

Primary Examiner—Edward R. Kazenske
Attorney, Agent, or Firm—Birch, Stewart, Kolasch & Birch

[57] ABSTRACT

In an oil pressure controlled brake system, wherein the brake oil contained within a wheel cylinder is returned to an oil reservoir associated with a master cylinder when the wheel lock or impending lock is detected. In a preferred form, an electromagnetic cross valve responsive to the detected wheel lock or impending lock is provided for returning the brake oil from the wheel cylinder to the master cylinder via the electromagnetic cross valve and a pressure control valve.

5 Claims, 18 Drawing Figures

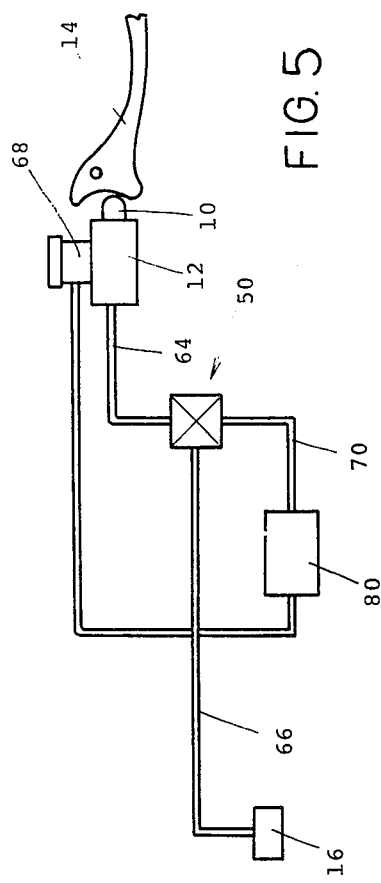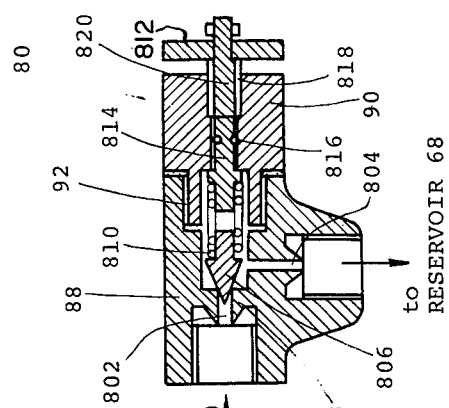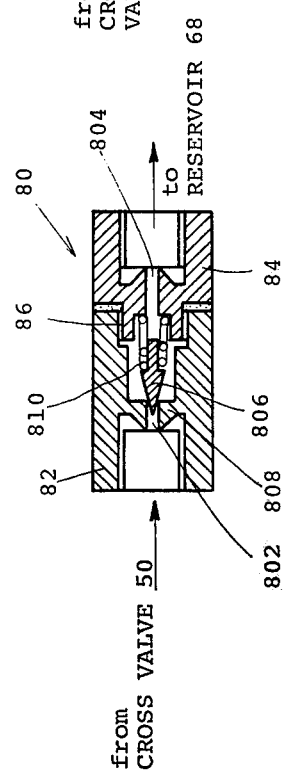

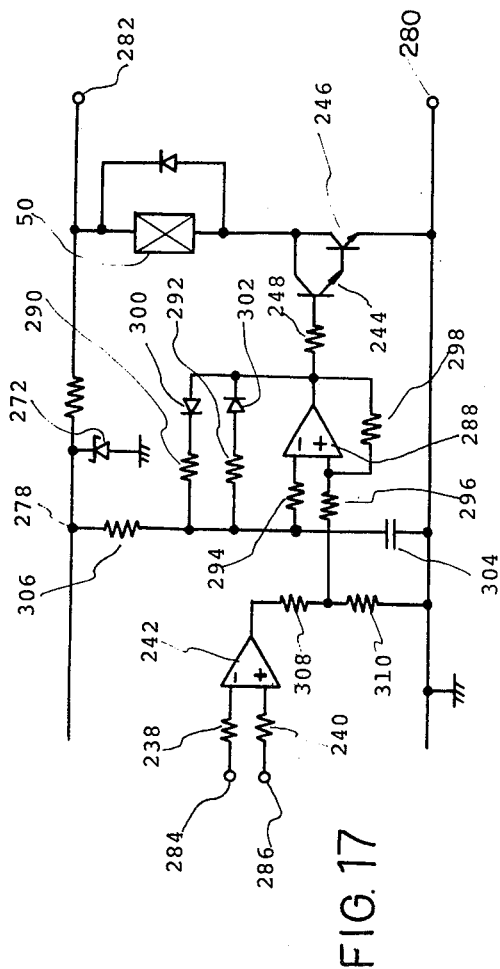
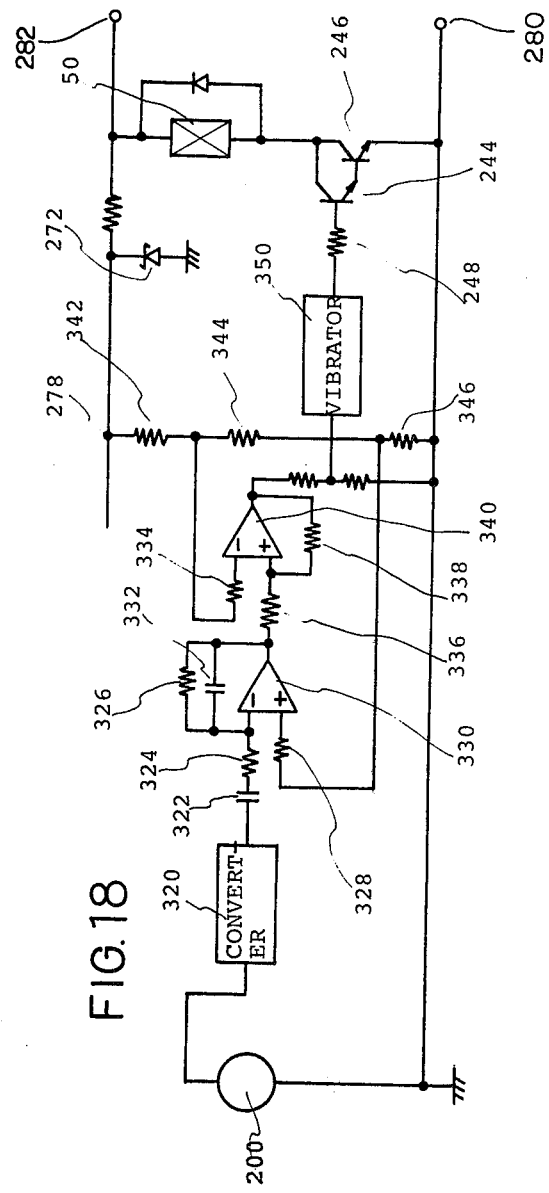
FIG. 17
FIG. 18

ANTILOCK BRAKE CONTROL SYSTEM FOR A MOTORCYCLE FRONT WHEEL

BACKGROUND OF THE INVENTION

The present invention relates to an antilock brake control system for a motorcycle front wheel.

In a prior art antilock brake control system, a diaphragm type pressure difference detection means is provided for controlling the application of the oil pressure from the master cylinder to the wheel cylinder. An electromagnetic cross valve associated with the pressure difference detection means is provided for creating the pressure difference within the pressure difference detection means when the wheel lock or impending lock is detected, thereby inhibiting the application of the oil pressure from the master cylinder to the wheel cylinder and reducing the oil pressure within the wheel cylinder.

The diaphragm type pressure difference detection means is unavoidably required in the prior art antilock brake control system, and this produces a large antilock brake control system. Moreover, the diaphragm type pressure difference detection means requires a vacuum source and, therefore, the antilock brake control system of the prior art is not applicable to a motorcycle.

OBJECTS AND SUMMARY OF THE INVENTION

Accordingly, an object of the present invention is to provide an antilock brake control system of a simple construction.

Another object of the present invention is to provide an antilock brake control system applicable to a front wheel of a motorcycle.

Still another object of the present invention is to provide a control circuit assembly associated with an antilock brake control system for a front wheel of a motorcycle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the brake oil contained within a wheel cylinder is returned to an oil reservoir associated with a manually actuated master cylinder when the wheel lock or impending lock is detected. An electromagnetic cross valve responsive to the detected wheel lock or impending lock is provided for returning the brake oil from the wheel cylinder to the master cylinder by selectively energizing the electromagnetic cross valve.

In a preferred form, a pressure control valve is interposed within a feedback loop from the electromagnetic cross valve to the master cylinder, whereby the oil pressure in the wheel cylinder is controlled not to fall below a predetermined value selected by the pressure control valve.

In another preferred form, a control circuit assembly is constructed so as to interrupt the energization of the electromagnetic cross valve for a short period of time when the electromagnetic cross valve is continuously energized for a period of time longer than a predetermined value.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 is a block diagram of another embodiment of an antilock brake control system of the present invention;

FIG. 6 is a cross-sectional view of an embodiment of a pressure control valve employed in the antilock brake control system of FIG. 5;

FIG. 7 is a cross-sectional view of another embodiment of a pressure control valve employed in the antilock brake control system of FIG. 5;

FIG. 17 is a circuit diagram of an essential part of another embodiment of a control circuit of an antilock brake control system of the present invention; and FIG. 18 is a circuit diagram of still another embodiment of a control circuit of an antilock brake control system of the present invention.

DESCRIPTION OF THE PREFERRED EMBODIMENTS

Figure 1:
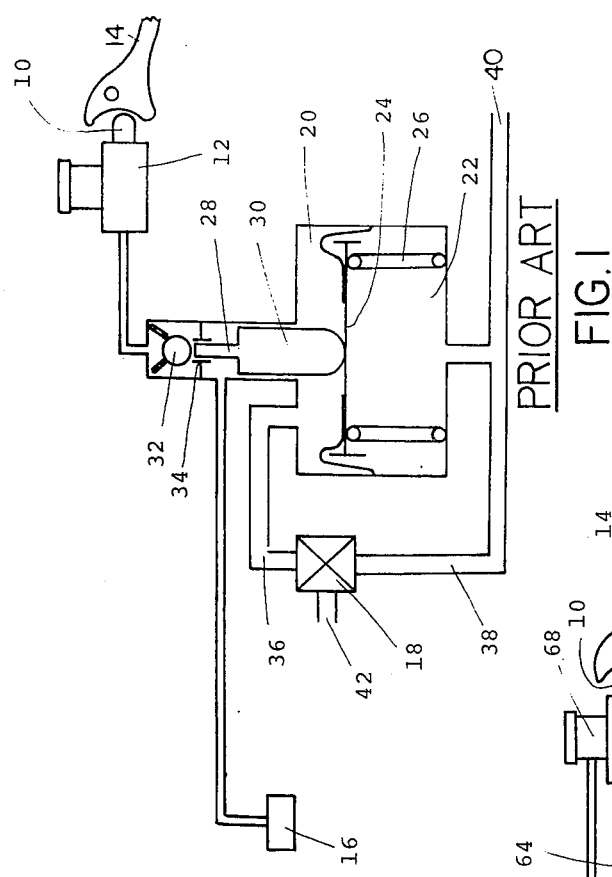
FIG. 1 is a block diagram of an antilock brake control system of the prior art.

Referring now in detail to the drawings, and to facilitate a more complete understanding of the present invention, a typical construction of an antilock brake control system of the prior art will be first described with reference to FIG. 1.

A piston 10 of a master cylinder 12 is controlled by a hand brake lever 14. The oil pressure in the master cylinder 12 is applied to a wheel cylinder 16 associated with the wheel brake mechanism. When the wheel lock or impending lock is detected by a suitable detection means, an electromagnetic valve 18 is energized so as to create a pressure difference between chambers 20 and 22. Therefore, a diaphragm 24 is pulled downward against springs 26 and, hence, rods 28 and 30 travel downward, whereby a ball check valve 32 is forced to come into contact with a valve seat 34. Under these conditions, the oil pressure in the master cylinder 12 is not applied to the wheel cylinder 16, and the pressure in the wheel cylinder 16 is reduced since the rod 30 is shifted downward.

When the vehicle recovers from the wheel lock or impending lock, the electromagnetic valve 18 is disabled so as to restore communication between conduits 36 and 38. The chambers 20 and 22 are maintained at the same pressure and, therefore, the diaphragm 24 is depressed upward by the springs 26. The wheel cylinder pressure is again increased since the rod 30 is driven to travel upward. In the system of FIG. 1, a conduit 40 is connected to a vacuum source (not shown), and the electromagnetic valve 18 is opened to the air through a conduit 42.

The above-mentioned antilock brake control system of the prior art includes the diaphragm structure, which renders the system large. Moreover, the vacuum source is unavoidably required and, therefore, the antilock brake control system of the prior art is not suited for a motorcycle.

Figure 2:
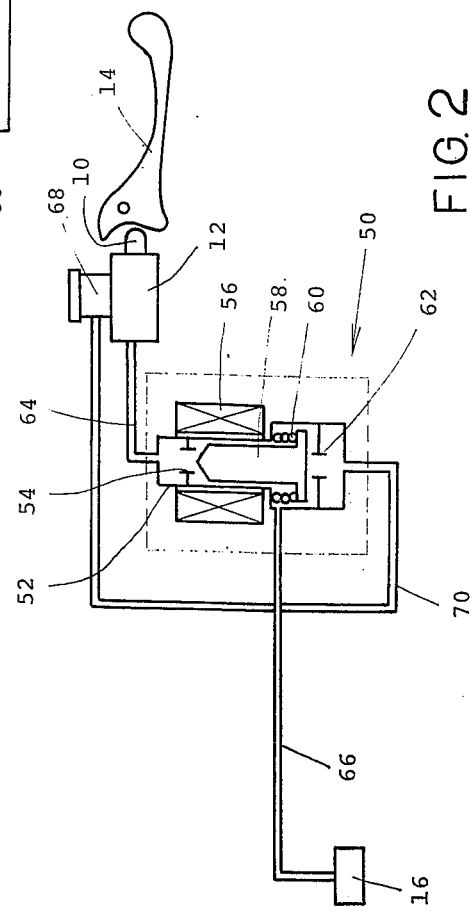
FIG. 2 is a block diagram of an embodiment of an antilock brake control system of the present invention.

FIG. 2 shows an embodiment of an antilock brake control system of the present invention. Like elements corresponding to those of FIG. 1 are indicated by like numerals.

The gist of the present invention is to provide an electromagnetic cross valve 50 for controlling the supply direction of the brake oil. The electromagnetic cross valve 50 comprises a casing 52, a valve seat 54, a winding 56, a plunger 58, springs 60, and another valve seat 62.

In the normal condition, or in the safe brake condition, the winding 56 is not enabled. The plunger 58 is pulled downward by the springs 60 so that the bottom surface of the plunger 58 is forced to come into contact with the valve seat 62, and the upper surface of the plunger 58 is released from the valve seat 54. Therefore, the oil pressure created in the master cylinder 12 is applied to the wheel cylinder 16 through a conduit 64, the electromagnetic cross valve 50 and another conduit 66.

When the wheel lock or impending lock is detected, the winding 56 is enabled so as to pull the plunger 58 upward against the springs 60. The upper end of the plunger 58 is forced to come into contact with the valve seat 54, whereby the oil pressure created in the master cylinder 12 is not applied to the wheel cylinder 16. At the same time, the bottom surface of the plunger 58 is released from the valve seat 62, whereby the brake oil contained within the wheel cylinder 16 is returned to a reservoir 68 associated with the master cylinder 12 through the conduit 66, the electromagnetic cross valve 50 and a conduit 70. That is, the oil pressure in the wheel cylinder 16 is reduced, thereby recovering the wheel revolution.

When the wheel revolution is recovered, the winding 56 is again disabled, whereby the oil pressure created in the master cylinder 12 is transmitted to the wheel cylinder 16. At this moment, the piston 10 is shifted left by the amount corresponding to the oil amount returned to the reservoir 68 and, therefore, the oil pressure created in the master cylinder 12 is automatically reduced.

Figure 3:
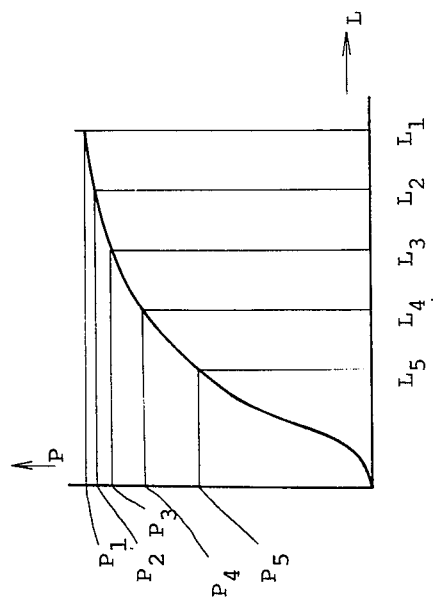
FIG. 3 is a graph for explanation of operation of the antilock brake control system of FIG. 2.
Figure 4:
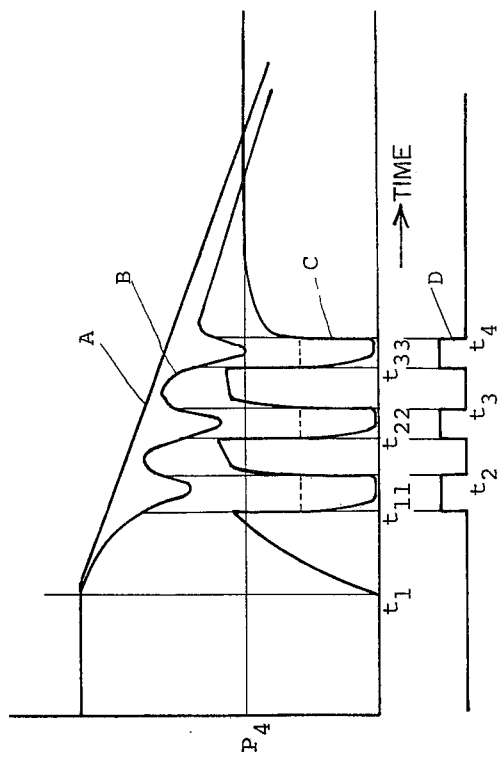
FIG. 4 is another graph for explanation of operation of the antilock brake control system of FIG. 2.

This will be fully understood from FIGS. 3 and 4. FIG. 3 shows the relationship between the distance L from the handle to the initial position of the hand brake lever 14 (along the abscissa axis) and the pressure P which can be created by the driver (along the ordinate axis). The brake pressure will not be created when the hand brake lever 14 is initially brought into contact with the handle, and the maximum brake pressure will be created when the hand brake lever 14 is initially spaced apart from the handle by $L_1$.

FIG. 4 shows the relationship between the time (along the abscissa axis) and the vehicle velocity A, the wheel velocity B, the wheel cylinder pressure C, and the driving signal D applied to the electromagnetic cross valve 50 (along the ordinate axis).

Now assume that the braking is initiated at the time $t_1$. The obtainable maximum brake pressure is $P_1$ as it will be clear from FIG. 3. During the braking operation, when the wheel lock or impending lock is detected by a suitable detection means at the time $t_{11}$, the electromagnetic cross valve 50 is enabled so as to decrease the wheel cylinder pressure toward zero. With this operation, the wheel velocity is recovered as shown by the curve B and, therefore, the energization of the electromagnetic cross valve 50 is terminated at the time $t_2$. Hence, the oil pressure created in the master cylinder 12 is again transmitted to the wheel cylinder 16. Assuming that the hand brake lever 14 is shifted to the position corresponding to the $L_2$ of FIG. 3 at this moment, the obtainable maximum brake pressure is $P_2$. However, the electromagnetic cross valve 50 is again energized when the wheel lock or impending lock is detected at the time $t_{22}$.

The above-mentioned operation is repeated till the maximum brake pressure, which is determined by the distance L between the hand brake lever 4 and the handle, falls to a desirable value depending on the conditions of the surface of the road, the weight of the vehicle, the brake gain, etc. For example, the above-mentioned operation is terminated when the hand brake lever 14 is shifted to the position corresponding to the distance $L_4$, whereby the preferred maximum brake pressure $P_4$ is obtained. Once the preferred maximum brake pressure $P_4$ is obtained, the electromagnetic cross valve 50 is no longer energized and, therefore, the driver can maintain the preferred maximum brake pressure.

When the driver releases the hand brake lever 14, the hand brake lever 14 is returned to the position corresponding to the distance $L_1$ since the brake oil is supplied from the reservoir 68 to the master cylinder 12.

The driver can recognize the over braking, because the hand brake lever 14 is shifted at the time $t_2$. Therefore, the wheel lock can be manually prevented by reducing the depression of the hand brake lever 14 after the time $t_2$. It is very dangerous in operating a motorcycle that the front wheel is locked. To prevent this, the valve structure comprising the upper end of the plunger 58 and the valve seat 54 can, alternatively, be removed so as not to prevent the brake oil supply from the master cylinder 12 to the electromagnetic cross valve 50. With such an arrangement, the hand brake lever 14 is shifted to come into contact with the handle when the anti-lock brake control system is once operated. That is, the driver must release the depression of the hand brake lever 14 when he desires to continue the braking operation.

The electromagnetic cross valve 50 is driven by a conventional control circuit for detecting the wheel lock or impending lock. The control circuit can be of the conventional slip modulus type or deceleration type associated with the wheel revolution sensor.

FIG. 5 shows another embodiment of an antilock brake control system of the present invention. Like elements corresponding to those of FIG. 2 are indicated by like numerals.

A pressure control valve 80 is interposed within the conduit 70 feeding back the brake oil from the electromagnetic cross valve 50 to the reservoir 68. The pressure control valve 80 functions to prevent the oil pressure in the wheel cylinder 16 from falling down to zero when the electromagnetic cross valve 50 is energized. That is, the pressure control valve 80 functions to limit the oil amount returning from the electromagnetic cross valve 50 to the reservoir 68 when the electromagnetic cross valve 50 is energized. By providing the pressure control valve 80, the brake pressure control is more accurately achieved, or more frequently achieved, because the shift length, that is, $(L_1-L_2)$, $(L_2-L_3)$, etc., of the hand brake lever 14 is reduced. Thus the performed wheel cylinder pressure control is exemplary shown by broken lines in FIG. 4.

FIG. 6 shows an embodiment of the pressure control valve 80. An opening including a port 802 is connected to the electromagnetic cross valve 50 via the conduit 70, and another opening including another port 804 is connected to the reservoir 68 via the conduit 70. In the normal condition, a valve means 806 is forced to come into contact with a valve seat 808 by springs 810. When the electromagnetic cross valve 50 is energized, the oil pressure in the wheel cylinder 16 is applied to the valve means 806 via the conduit 70 and the port 802 so as to depress the valve means 806 toward the right against the springs 810. When the applied oil pressure is stronger than the spring force, the valve means 806 is released from the valve seat 808 so as to allow the oil flow from the electromagnetic cross valve 50 to the reservoir 68 through the pressure control valve 80.

Upon returning of the brake oil to the reservoir 68, the wheel cylinder pressure is reduced. When the spring force becomes stronger than the wheel cylinder pressure, the valve means 806 is again brought into contact with the valve seat 808, thereby precluding the oil return from the electromagnetic cross valve 50 to the reservoir 68 through the pressure control valve 80. That is, the brake pressure created in the wheel cylinder 16 will not be decreased below a predetermined value fixed by the spring force and the section of the port 802. A preferred value of the abovementioned threshold pressure is 10 to 25 kg/cm².

The above-mentioned pressure control valve 80 can be disassembled to casings 82 and 84, which are fixed to each other by screwed portions 86.

FIG. 7 shows another embodiment of the pressure control valve 80. Like elements corresponding to those of FIG. 6 are indicated by like numerals. The pressure control valve 80 of FIG. 7 includes a knob 812 for adjusting the threshold pressure determined by the pressure control valve 80.

The driver can determine the lowermost brake pressure when the antilock brake control system is operated through the use of the knob 812 in accordance with the conditions of the road surface. For example, on the dry asphalt road, a preferred threshold pressure is 40 kg/cm²; on the wet asphalt road, a preferred threshold pressure is 30 kg/cm²; and on the muddy road, a preferred threshold pressure is 5 kg/cm².

The springs 810 are fixed to a piston 814, which is slidably supported by an O-shaped ring 816. The piston 814 includes a screwed portion 818, where a rod 820 fixed to the knob 812 is secured. The threshold pressure of the valve means 806 is desirably selected through the use of the knob 812. That is the force caused by the springs 810 is varied by rotating the knob 812. The O-shaped ring 816 is provided for preventing the leakage of the brake oil. The pressure control valve 80 of FIG. 7 can be disassembled to casings 88 and 90, which are fixed to each other by screwed portions 92.

Figure 8:
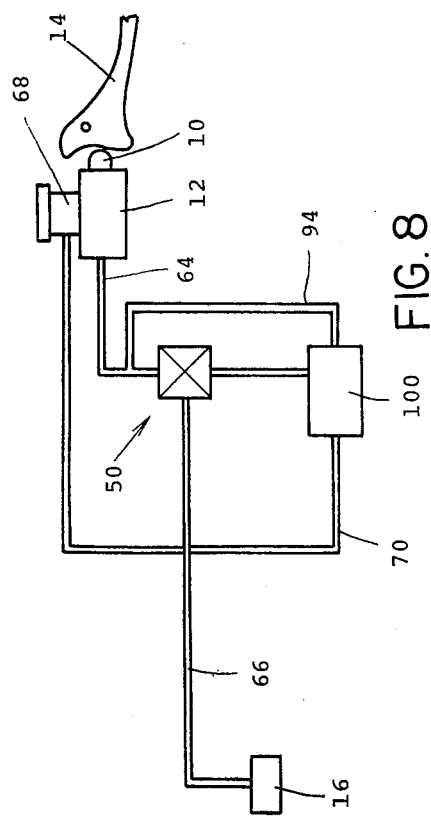
FIG. 8 is a block diagram of still another embodiment of an antilock brake control system of the present invention.

FIG. 8 shows still another embodiment of an antilock brake control system of the present invention. Like elements corresponding to those of FIG. 5 are indicated by like numerals.

The antilock brake control system of FIG. 8 includes a pressure control valve 100, the threshold pressure of which is controlled in response to the oil pressure in the master cylinder 12. The pressure in the wheel cylinder 16 is controlled to decrease to $\frac{1}{3}$ through $\frac{3}{4}$ times the pressure created in the master cylinder 12 when the electromagnetic cross valve 50 is energized.

The motorcycle driver well knows that locking of the front wheel is very dangerous and, therefore, he exerts careful control over the front wheel brake. According to the present invention there is no possibility that the driver will create pressure in the master cylinder twice or thrice the permissible pressure ensuring that the wheel will not lock. When the wheel cylinder pressure is reduced to $\frac{1}{3}$ through $\frac{3}{4}$ times the pressure created in the master cylinder 12, the wheel revolution will be recovered even when the impending lock is detected.

Figure 9:
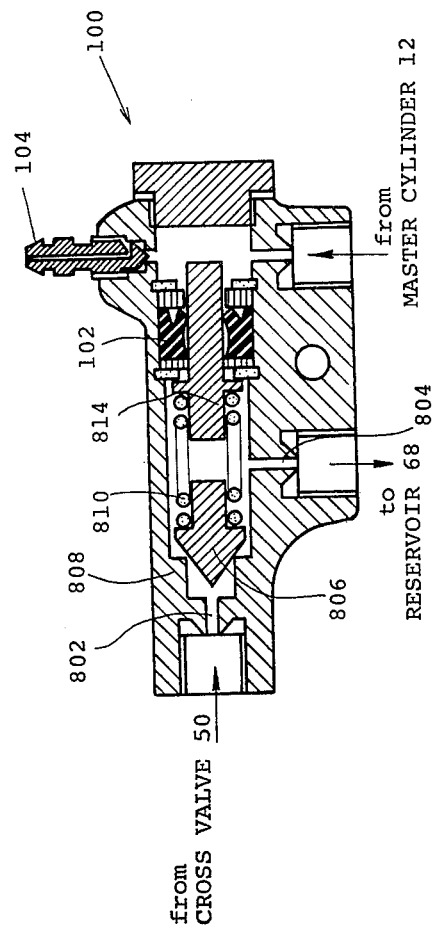
FIG. 9 is a cross-sectional view of an embodiment of a pressure control valve employed in the antilock brake control system of FIG. 8.

FIG. 9 shows an embodiment of the pressure control valve 100 employed in the antilock brake control system of FIG. 8. Like elements corresponding to those of FIG. 7 are indicated by like numerals.

The piston 814 fixed to the springs 810 is controlled to shift its position through the use of the brake pressure created in the master cylinder 12, which is introduced into the pressure control valve 100 via a conduit 94. When the electromagnetic cross valve 50 is energized, that is in the pressure reduction mode, the ratio between the lowermost pressure in the wheel cylinder 16 and the pressure created in the master cylinder 12 is determined by the section of the piston 814 and the aperture of the valve seat 808. The volume determined by the section of the piston 814 and the shift length of the piston 814 should be selected small, for example, below 0.1 cc, in order to ensure the strict brake operation. An oil seal 102 is secured around the piston 814 so as to prevent the leakage of the brake oil introduced from the master cylinder 12 to the port 804 connected to the reservoir 68. Character 104 represents an air vent.

Figure 10:
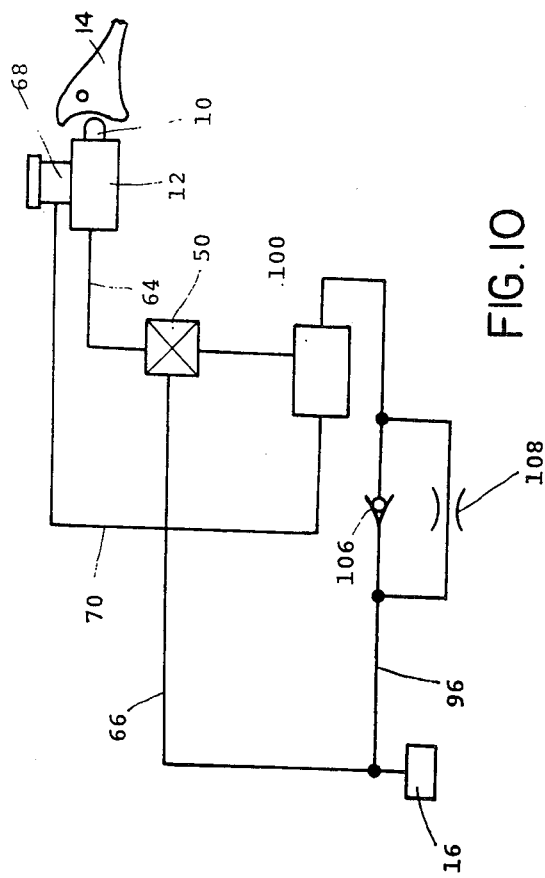
FIG. 10 is a block diagram of yet another embodiment of an antilock brake control system of the present invention.

FIG. 10 shows yet another embodiment of an antilock brake control system of the present invention employing the pressure control valve 100 of FIG. 9. Like elements corresponding to those of FIG. 8 are indicated by like numerals.

In this embodiment, the piston 814 of the pressure control valve 100 is connected to receive the pressure created in the wheel cylinder 16 via a conduit 96. A check valve 106 and a throttle 108 is interposed within the conduit 96.

Figure 11:
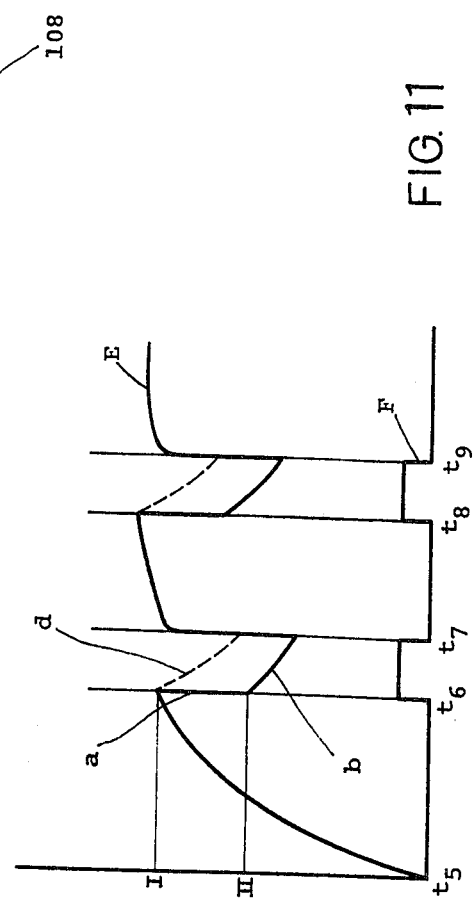
FIG. 11 is a graph for explanation of operation of the antilock brake control system of FIG 10.

The operation of the antilock brake control system of FIG. 10 will be described with reference to FIG. 11. FIG. 11 shows the relationship between the time and the driving signal F applied to the electromagnetic cross valve 50 (along the abscissa axis) and the pressure E created in the wheel cylinder 16 (along the ordinate axis). I and II represent the pressure values.

During the time period between $t_5$ and $t_6$, the pressure created in the master cylinder 12 is transmitted to the wheel cylinder 16 without any deviation. At this moment, the check valve 106 is in the open condition and, therefore, the piston 814 of the pressure control valve 100 receives the same pressure as created in the wheel cylinder 16.

When the wheel cylinder pressure E reaches the first value I and the electromagnetic cross valve 50 is energized at the time $t_6$, the wheel cylinder pressure E is suddenly reduced to the second value II, which is proportional to the first value I, as shown by a curve $a$ in FIG. 11. At this moment, the check valve 106 is closed, and the pressure applied to the piston 814 of the pressure control valve 100 is transmitted to the wheel cylinder 16 through the throttle 108. The pressure applied to the piston 814 of the pressure control valve 100 is decreased as shown by a broken curve $d$ in FIG. 11. Accordingly, the wheel cylinder pressure E is decreased in proportion to the pressure reduction d, as shown by a curve b in FIG. 11.

The wheel cylinder pressure E is gradually reduced as shown by the curve b and, therefore, the overreduction of the wheel cylinder pressure can be precluded. By preferably selecting the first and second values I and II, the wheel lock can be prevented even on a muddy road.

The check valve 106 can be of the same construction as the pressure control valve 80 shown in FIG. 6. The threshold pressure of the check valve 106 should be selected at a low value. The throttle 108 can be of a conventional construction. In a preferred form, the throttle 108 can be made of a combination of a piston and a cylinder between which a short clearance is provided, the brake oil being conducted therethrough.

The electromagnetic cross valve 50 can be driven by a conventional control circuit associated with a wheel revolution sensor. However, the electromagnetic cross valve 50 can be driven in a more simple way. For example, a typical detection system includes a flywheel decelerating at about 1 to 3g ($g = 9.8$ m/sec$^2$). When the wheel revolution velocity becomes below the flywheel revolution velocity, a suitable switching means energizes the electromagnetic cross valve 100. Alternatively, an oil pressure switching valve may be employed instead of the electromagnetic cross valve 50. The oil pressure switching valve is driven to switch through the use of the force created by the difference between the flywheel revolution and the wheel revolution.

Although in the foregoing embodiments the master cylinder, the electromagnetic cross valve and the pressure control valve are discrete from each other, they can be integrally formed in a single block.

The conduit 70 for returning the brake oil should be connected directly to the brake oil contained within the reservoir 68 so as to prevent the introduction of bubbles into the brake oil.

Figure 12:
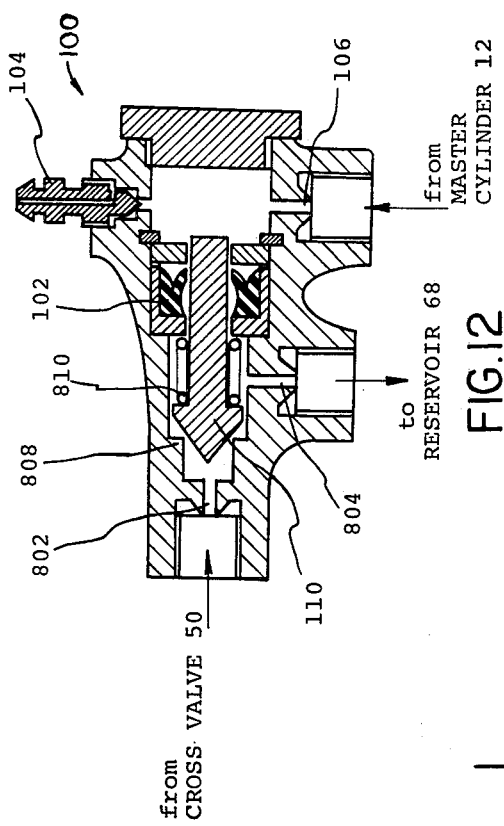
FIG. 12 is a cross-sectional view of another embodiment of a pressure control valve employed in the antilock brake control system of FIG. 8.

FIG. 12 shows another embodiment of the pressure control valve 100 employed in the antilock brake control system of FIG. 8. Like elements corresponding to those of FIG. 9 are indicated by like numerals.

The aperture including the port 802 is connected to receive the oil pressure from the electromagnetic cross valve 50. The aperture including the port 804 is connected to the reservoir 68 via the conduit 70. The aperture including a port 106 is connected to the master cylinder 12 via the conduit 94. In the normal condition, an integral valve/piston means 110 is depressed towards the left by the springs 810.

When the electromagnetic cross valve 50 is energized, the oil pressure in the wheel cylinder 16 is applied to the integral valve/piston means 110 via the conduit 66, the electromagnetic cross valve 50 and the port 802. This pressure functions to depress the integral valve/piston means 110 towards the right. When the force depressing the integral valve/piston means 110 towards the right becomes greater than the force depressing said means 110 towards the left, which is the sum of the spring force and the force determined by the master cylinder pressure and the section of the integral valve/piston means 110, the integral valve/piston means 110 is released from the valve seat 808. The brake oil contained within the wheel cylinder 16 is returned to the reservoir 68 through the conduit 66, the electromagnetic cross valve 50, the port 802, the port 804 and the conduit 70.

With this oil flow, when the force depressing the integral valve/piston means 110 towards the right, that is the wheel cylinder pressure, becomes less than the force depressing said means 110 towards the left, the integral valve/piston means 110 is brought into contact with the valve seat 808. Accordingly, the wheel cylinder pressure is reduced to a value proportional to the master cylinder pressure. The proportional constant is mainly depending on the section of the integral valve/piston means 110 and the aperture of the valve seat 808. The springs 810 function to force the integral vlve/piston means 110 to come into contact with the valve seat 808 even when the master cylinder pressure is zero. The spring force must be greater than the frictional force caused by the oil seal 102.

Referring again to FIG. 8, the antilock brake control system has the pressure control valve 100, of which the threshold pressure is determined in accordance with the master cylinder pressure. For example, the threshold pressure of the pressure control valve 100 is selected at 60° of the master cylinder pressure. Therefore, when the master cylinder pressure is increased to 40 kg/cm$^2$ under the condition where the motor cycle travels on the road where the permissible wheel cylinder pressure is 20 kg/cm$^2$, the electromagnetic cross valve 50 is energized and the wheel cylinder pressure is reduced to 24 kg/cm$^2$. Thus reduced wheel cylinder pressure is greater than the permissible wheel cylinder pressure and, therefore, the motorcycle falls into the wheel locked condition.

Figure 13:
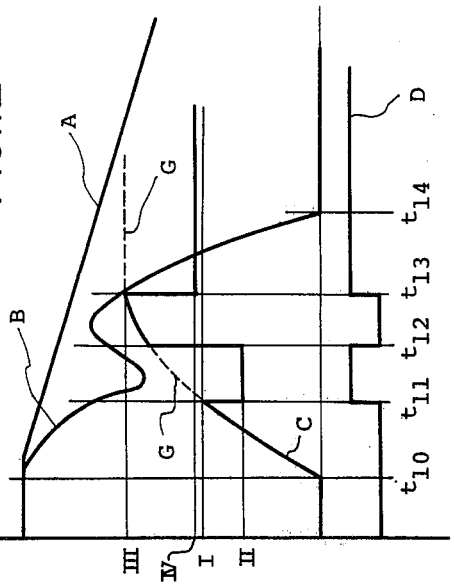
FIG. 13 is a graph for explanation of the undesirable operation of the antilock brake control system of FIG. 8.

FIG. 13 shows the above-mentioned undesirable brake control. That is, the vehicle velocity A, the wheel velocity B, the wheel cylinder pressure C, the driving signal D applied to the electromagnetic cross valve 50, and the master cylinder pressure G in the excess braking condition are shown along the ordinate axis. The brake operation is initiated at the time $t_{10}$. When the wheel cylinder pressure C reaches an excess pressure I at the time $t_{11}$ and the impending lock is detected by a suitable detection means, the electromagnetic cross valve 50 is energized by the driving signal D. During this time period between $t_{10}$ and $t_{11}$, the wheel cylinder pressure C is identical with the master cylinder pressure G. When the eklectromagnetic cross valve 50 is energized at the time $t_{11}$, the wheel cylinder pressure C is reduced to the value II proportional to the first pressure I. With this reduction of the wheel cylinder pressure C, the wheel velocity B is recovered and the electromagnetic cross valve 50 is disabled at the time $t_{12}$. However, the master cylinder pressure G continues to increase even in the time period between $t_{11}$ and $t_{12}$.

Figure 14:
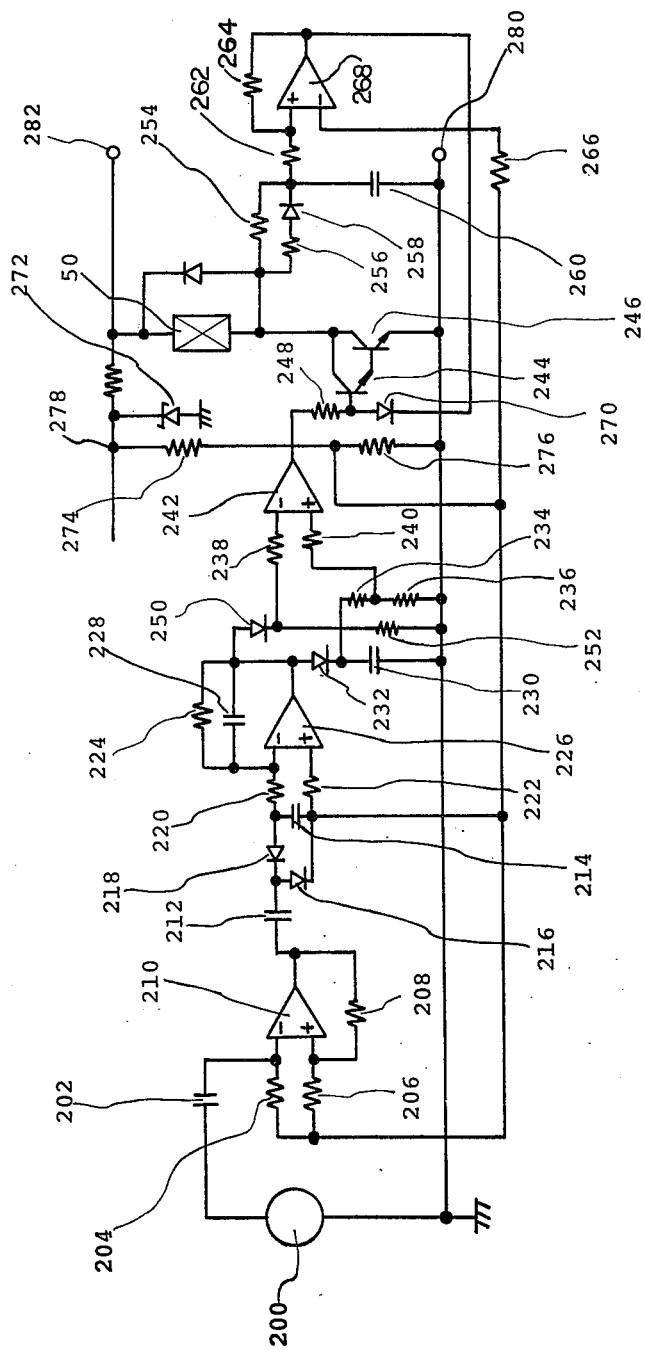
FIG. 14 is a circuit diagram of an embodiment of a control circuit of an antilock brake control system of the present invention.

When the wheel velocity B decreases in such a manner as to show the impending lock at the time $t_{13}$, the electromagnetic cross valve 50 is again energized, whereby the wheel cylinder pressure C is reduced to the value IV proportional to the value III. However, the reduced pressure IV is greater than the perimssible pressure and, therefore, the wheel is completely locked at the time $t_{14}$ even though the electromagnetic cross valve 50 is continuously energized after the time $t_{13}$. FIG. 14 shows an example of a control circuit which can prevent the above-mentioned wheel lock in the excess braking.

A wheel revolution sensor 200 develops a signal of a frequency proportional to the wheel revolution velocity. The output signal of the wheel revolution sensor 200 is introduced through a coupling capacitor 202 to the Schmidt circuit including resistors 204, 206 and 208, and an operation amplifier 210 so as to produce a rectangular shaped waveform signal. The shaped rectangular waveform signal is introduced into a pumping circuit comprising capacitors 212 and 214, diodes 216 and 218, and a resistor 220, which develops a D.C. voltage proportional to the frequency of the signal derived from the wheel revolution sensor 200. The obtained D.C. voltage is amplifier at an amplifier including the resistors 220, 222 and 224, and an operation amplifier 226, which develops a voltage corresponding to the wheel velocity. A capacitor 228 is provided so as to reduce the ripple included within the obtained wheel velocity voltage.

The wheel velocity voltage is charged by a capacitor 230 through a diode 232, and is gradually discharged through resistors 234 and 236, whereby a simulated vehicle velocity voltage is stored across the capacitor 230. A comparator comprising resistors 238 and 240, and an operation amplifier 242 functions to compare the wheel velocity voltage with a value of 90% of the simulated vehicle velocity voltage. When the wheel velocity voltage is less than the value of 90% of the simulated vehicle velocity, the operation amplifier 242 develops a signal of the high level, thereby conducting transistors 244 and 246 through a resistor 248. At this moment the electromagnetic cross valve 50 is energized. A combination of a diode 250 and a resistor 252 functions to compensate for the variations of the characteristics of the diode 232 and the resistors 234 and 236. That is, the combination of the diode 250 and the resistor 252 has the same voltage shift and temperature characteristics as the combination of the diode 232 and the resistors 234 and 236.

A charge/discharge circuit, which includes resistors 254 and 256, a diode 258 and a capacitor 260, and the Schmidt circuit, which includes resistors 262, 264 and 266 and an operation amplifier 268, in combination, form a timer circuit showing a hysteresis characteristic.

Figure 15:
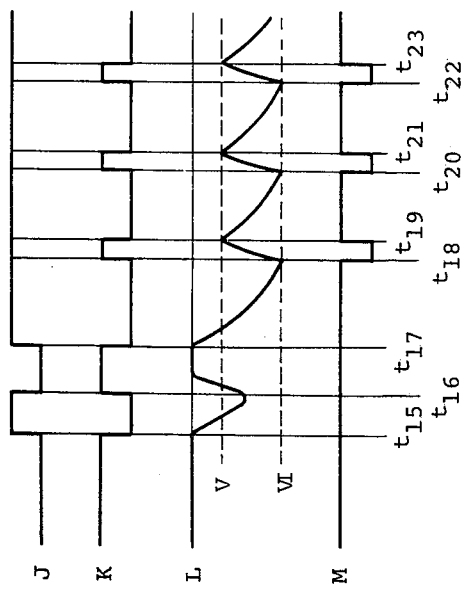
FIG. 15 is a time chart for explanation of operation of the control circuit of FIG. 14.

The operation of the timer circuit will be described with reference to FIG. 15. FIG. 15 shows an output voltage J of the operation amplifier 242, a collector voltage K of the transistor 246, a voltage L charged across the capacitor 260, and an output voltage M of the operation amplifier 268 along the ordinate axis. In the normal condition, before the time $t_{15}$, the wheel velocity voltage is higher than the 90% of the simulated vehicle velocity voltage and, therefore, the output voltage J of the operation amplifier 242 is at the low level. The transistor 246 is not conductive and, hence, its collector voltage K is at the high level. The capacitor 260 is charged through the resistor 256 and the diode 258. The voltage L charged across the capacitor 260 is higher than a level V determined by a reference level introduced through the resistor 266 and the hysteresis of the Schmidt circuit and, therefore, the output voltage M of the operation amplifier 268 is at the high level. A diode 270 is biased backward and, therefore, the transistor 244 is stable.

Now assume that the wheel velocity voltage becomes below 90% of the simulated vehicle velocity voltage during the time period between $t_{15}$ and $t_{16}$, the output voltage J of the operation amplifier 242 bears the high level. Therefore, the transistor 246 is conductive, and its collector voltage K bears the low level. At this moment, the voltage charged across the capacitor 260 is discharged through the resistor 254. When the time period between $t_{15}$ and $t_{16}$ is relatively short, the voltage L stored by the capacitor 260 is not reduced to a value VI sufficient to drive the Schmit circuit. Therefore, the output voltage M of the operation amplifier 268 is maintained at the high level. When the output voltage of the operation amplifier 242 is reduced and the transistor 246 become nonconductive at the time $t_{16}$, the capacitor 260 is again charged through the resistors 254 and 256 and the diode 258. The resistance value of the resistor 256 is selected lower than that of the resistor 254 so as to increase the charge speed with respect to the discharge speed.

Now assume that the wheel velocity voltage is less than 90% of the simulated vehicle velocity voltage after the time $t_{17}$. The output voltage J of the operation amplifier 242 is maintained at the high level. The transistor 246 becomes conductive at the time $t_{17}$ and, therefore, the collector voltage K of the transistor 246 bears the low level. At this moment the voltage charged across the capacitor 260 is discharged through the resistor 254.

When the voltage L charged across the capacitor 260 reaches the value VI sufficient to drive the Schmidt circuit at the time $t_{18}$, the output voltage M of the operation amplifier 268 bears the low level. The base electrode of the transistor 244 is pulled to the low level via the diode 270 and, hence, the transistors 244 and 246 are not conductive, whereby the collector voltage K of the transistor 246 bears the high level. Under these conditions, the capacitor 260 is again charged. When the voltage L charged across the capacitor 260 reaches the value V sufficient to invert the Schmidt circuit at the time $t_{19}$, the output voltage M of the operation amplifier 268 again bears the high level. The transistors 244 and 246 are again conductive to drive the electromagnetic cross valve 50. The above-mentioned operation is repeated so as to repeat the energization and the disabling of the electromagnetic cross valve 50 during the time period when the output voltage J of the operation amplifier 242 bears the high level.

Referring again to FIG. 14, a constant voltage diode 272 and resistors 274 and 276 function, in combination, to supply the reference voltage to the operation amplifiers 210, 226 and 268. A node 278 is a constant voltage terminal, and a terminal 280 is grounded. Another terminal 282 is connected to the positive terminal of the battery carried by the vehicle.

Figure 16:
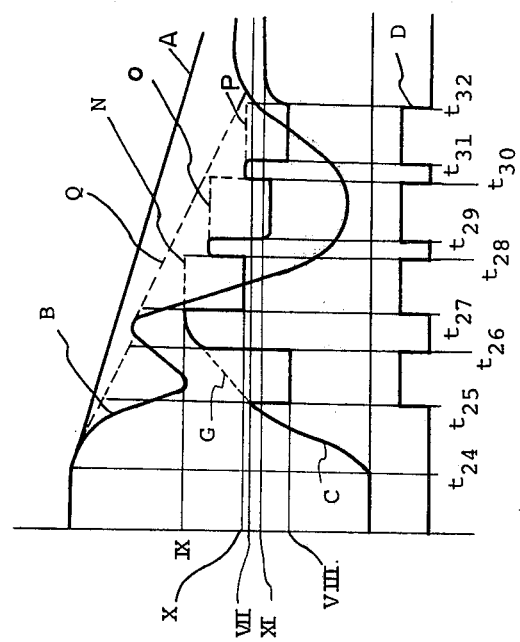
FIG. 16 is a graph for explanation of the antilock brake control system employing the control circuit of FIG. 14.

The operation of the antilock brake control system including the control circuit of FIG. 14 will be described with reference to FIG. 16. FIG. 16 shows the vehicle velocity A under the excess brake operation, the wheel velocity B under the excess brake operation, the wheel cylinder pressure C, the driving signal D applied to the electromagnetic cross valve 50, the master cylinder pressure G, N, O and P, and the simulated vehicle velocity Q. The brake operation is initiated at the time $t_{24}$. The wheel velocity B is reduced to a value below 90% of the simulated vehicle velocity Q at the time $t_{25}$. The output voltage of the operation amplifier 242 bears the high level such that the transistors 244 and 246 are conducted. Therefore, the electromagnetic cross valve 50 is energized so as to reduce the wheel cylinder pressure C to a value VIII proportional to a value VII. With this reduction of the wheel cylinder pressure C, the wheel velocity B is recovered.

When the wheel velocity B becomes greater than 90% of the simulated vehicle velocity Q (the time $t_{26}$), the electromagnetic cross valve 50 is disabled. The master cylinder pressure is increased during the time period between $t_{25}$ and $t_{26}$, as shown by the broken line G. The electromagnetic cross valve 50 is again energized at the time $t_{27}$, because the wheel velocity B is reduced to a value below 90% of the simulated vehicle velocity Q at the time $t_{27}$. The wheel revolution is not recovered even though the wheel cylinder pressure C is reduced to a value X proportional to a value IX as already discussed above with reference to FIG. 13. The output voltage of the operation amplifier 242 is maintaind at the high level, and the electromagnetic cross valve 50 is driven to repeat the ON and OFF operations during the time period of $t_{27}$ through $t_{32}$ in a manner as discussed with reference to FIG. 15. Now remember that the brake oil contained within the wheel cylinder 16 is returned to the reservoir 68 at every energization of the electromagnetic cross valve 50. That is, the obtainable maximum pressure is reduced at every energization of the electromagnetic cross valve 50 as shown by broken lines N, O and P in FIG. 16. It will be clear that the wheel cylinder pressure C is reduced to recover the wheel velocity B. The wheel velocity B exceeds 90% of the simulated vehicle velocity Q at the time $t_{32}$. Then, the output voltage of the comparactor 242 bears the low level, and the electromagnetic cross valve 50 will not be enabled.

In this way, the master cylinder pressure and the wheel cylinder pressure are controlled to become a preferred maximum pressure XI. When the wheel cylinder pressure reaches the preferred maximum pressure XI, the electromagnetic cross valve 50 will no longer be enabled. The period during which the electromagnetic cross valve 50 is disabled, that is, the time period between $t_{28}$ and $t_{29}$, or between $t_{30}$ and $t_{31}$, should be selected around 20 msec.

FIG. 17 shows an essential part of another example of the control circuit of the antilock brake control system of the present invention. Like elements corresponding to those of FIG. 14 are indicated by like numerals. An input terminal 284 of the operation amplifier 242 is connected to the joint of the diode 250 and the resistor 252, and another input terminal 286 of the operation amplifier 242 is connected to the joint of the resistors 234 and 236. An operation amplifier 288, resistors 290, 292, 294, 296 and 298, diodes 300 and 302, and a capacitor 304 form, in combination, an astable multivibrator. The diodes 300 and 302 function to determine the ON period and the OFF period of the astable multivibrator at different values.

In the normal condition, the output voltage of the operation amplifier 242 bears the low level. The positive input terminal of the operation amplifier 288 is maintained at the low level, and the negative input terminal of the operation amplifier 288 is maintained at a slightly high level by a resistor 306. Therefore, the astable multivibrator does not operate. That is, the output voltage of the operation amplifier 288 is maintained at the low level and, hence, the transistors 244 and 26 and the electromagnetic cross valve 50 are not conducted or energized.

When the wheel velocity is suddenly reduced, the output voltage of the operation amplifier 242 bears the high level. The positive input terminal of the operation amplifier 288 is connected to receive a reference potential determined by resistors 308 and 310. When the above-mentioned reference potential is selected higher than the potential determined by the resistor 306, the output voltage of the operation amplifier, first, bears the high level. The transistors 244 and 246 are conducted to energize the electromagnetic cross valve 50. Thereafter, the astable multivibrator repeats the ON and OFF operations while the output voltage of the operation amplifier 242 is maintained at the high level. In response to this switching of the astable multivibrator, the transistors 244 and 246 repeat the switching.

FIG. 18 shows still another embodiment of the control circuit of the antilock brake control system of the present invention. Like elements corresponding to those of FIGS. 14 and 17 are indicated by like numerals.

A frequency to voltage converter 320 is connected to receive the frequency signal from the wheel revolution sensor 200 to develop a D.C. voltage corresponding to the wheel velocity. The converter 320 includes the operation amplifiers 210, 266, etc., shown in FIG. 14. A capacitor 322, resistors 324, 326 and 328 and an operation amplifier 330 form, in combination, a differentiation/amplifying circuit. The operation amplifier 330 develops a voltage signal corresponding to the detected wheel acceleration and deceleration. A capacitor 332 functions to absorb the ripple. Resistors 334, 336 and 338 and an operation amplifier 340 form, in combination, the Schmidt circuit, which develops a signal of the high level when the wheel acceleration/deceleration voltage is greater than a first predetermined level, and a signal of the low level when the wheel acceleration/deceleration voltage is less than a second predetermined level.

The first and second levels can be determined through the use of resistors 342, 344 and 346, which provide, in combination, a reference level, and the resistors 336 and 338, which provide, in combination the Schmidt circuit with the hysteresis behavior. The first level is preferably selected at the wheel deceleration 1.5 to 2.5g ($g = 9.8$ m/sec$^2$), and the second level is preferably selected around the wheel acceleration 0.5g. When the first and second levels are determined in such a manner as discussed above, the output voltage of the operation amplifier 340 is maintained at the high level during the time period $t_{27}$ through $t_{31}$ (see FIG. 16). Character 350 represents the astable multivibrator including the operation amplifier 288 shown in FIG. 17. The astable multivibrator 350 repeats the ON and OFF operations while the output voltage of the operation amplifier 340 bears the high level. That is, the embodiment shown in FIG. 18 relates to the antilock brake control system of the deceleration type.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a closed loop oil pressure actuated brake system including a master cylinder, a wheel cylinder, means for detecting wheel lock or impending lock and means for returning the brake oil contained within the wheel cylinder to a reservoir associated with the master cylinder through a pressure control valve when wheel lock or impending lock is detected, the improvement comprising:

an electromagnetic cross valve assembly including an inlet and a first outlet port for communicating brake oil pressure created within said master cylinder to said wheel cylinder, and a second outlet port connected to said pressure control valve, said electromagnetic cross valve assembly being actuated by said detecting means to close said inlet port and connect the brake oil pressure within said wheel cylinder to a first inlet in said pressure control valve through said first and second outlet ports of said electromagnetic cross valve when wheel lock or impending lock is detected;

said pressure control valve including a reciprocable valve element therein which is responsive to said brake oil pressure within said wheel cylinder supplied to said first inlet in said pressure control valve on one side of said valve element and also being responsive to said brake oil pressure created within said master cylinder which is supplied to a second inlet in said pressure control valve on the other side of said valve element which is always in direct communication with the brake oil from said master cylinder;

a seal means positioned adjacent said reciprocable valve element for isolating the brake oil from said wheel cylinder from the brake oil from said master cylinder;

said pressure control valve including an outlet for returning the brake oil from said wheel cylinder to said reservoir associated with said master cylinder only when a force created by said brake oil pressure from said wheel cylinder acting on said one side of said reciprocable valve element is greater than a foce created by the brake oil pressure acting on said other side of said reciprocable valve element from said master cylinder.

2. The brake control system according to claim 1, wherein said reciprocable valve element is spring biased to normally close said first inlet.

3. The brake control system according to claim 1, wherein said seal means surrounds a stem portion of said reciprocable valve element to prevent the brake oil from said wheel cylinder from communicating with said brake oil from said master cylinder.

4. A closed loop oil pressure actuated brake system according to claim 1, wherein said means for detecting wheel lock or impending lock includes a first means for developing a detection signal when the electromagnetic cross valve is continuously energized for more than a predetermined time period and a second means for intermittently energizing the electromagnetic cross valve when the detection signal is derived from the first means.

5. The brake system of claim 4, wherein the second means include an astable multivibrator.

* * * * *